(12) United States Patent
Kojima

(10) Patent No.: US 10,006,430 B2
(45) Date of Patent: Jun. 26, 2018

(54) VEHICLE CONTROL DEVICE

(71) Applicant: Susumu Kojima, Susono (JP)

(72) Inventor: Susumu Kojima, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 143 days.

(21) Appl. No.: 14/766,227

(22) PCT Filed: Apr. 16, 2013

(86) PCT No.: PCT/JP2013/061320
§ 371 (c)(1),
(2) Date: Aug. 6, 2015

(87) PCT Pub. No.: WO2014/170962
PCT Pub. Date: Oct. 23, 2014

(65) Prior Publication Data
US 2016/0003207 A1    Jan. 7, 2016

(51) Int. Cl.
*F02N 19/00* (2010.01)
*F02D 41/00* (2006.01)
(Continued)

(52) U.S. Cl.
CPC .............. *F02N 15/022* (2013.01); *B60K 6/48* (2013.01); *B60K 6/547* (2013.01); *B60W 10/02* (2013.01);
(Continued)

(58) Field of Classification Search
CPC .............. F02N 11/0814; F02N 11/0833; F02N 19/001; F02N 19/005; F02N 2019/002;
(Continued)

(56) References Cited

U.S. PATENT DOCUMENTS 5,713,320 A * 2/1998 Pfaff ..................... F02N 11/006
123/179.3
8,738,205 B2 * 5/2014 Steuernagel ........... B60K 6/442
701/22
(Continued)

FOREIGN PATENT DOCUMENTS

DE      103 28 123 A1   1/2004
DE   10 2011 075 216 A1  11/2012
(Continued)

OTHER PUBLICATIONS

International Search Report dated May 21, 2013 for PCT/JP2013/061320 filed on Apr. 16, 2013.

*Primary Examiner* — Lindsay Low
*Assistant Examiner* — George Jin
(74) *Attorney, Agent, or Firm* — Oblon, McClelland, Maier & Neustadt, L.L.P.

(57) ABSTRACT

A control device of a vehicle including an engine, an electric motor, and a clutch disposed on a power transmission path between the engine and the electric motor, the control device of a vehicle performing an ignition start causing combustion in a cylinder of the engine to rotate the engine at a start of the engine, the control device of a vehicle switching a cylinder in which combustion is first caused in the engine based on an actuation during a rotation stop process of the engine of an exhaust valve in a cylinder stopped in an expansion stroke, when performing the ignition start at the start of the engine.

5 Claims, 8 Drawing Sheets

(51) Int. Cl.

| | | |
|---|---|---|
| *F02N 15/02* | (2006.01) | |
| *B60K 6/48* | (2007.10) | |
| *B60W 10/06* | (2006.01) | |
| *B60K 6/547* | (2007.10) | |
| *B60W 20/40* | (2016.01) | |
| *B60W 10/02* | (2006.01) | |
| *F02N 99/00* | (2010.01) | |
| *F02D 41/06* | (2006.01) | |
| *F02P 5/15* | (2006.01) | |
| *F02N 11/08* | (2006.01) | |

(52) U.S. Cl.
CPC ............ B60W 10/06 (2013.01); B60W 20/40 (2013.01); F02D 41/009 (2013.01); F02D 41/062 (2013.01); F02N 19/001 (2013.01); F02N 19/005 (2013.01); F02N 99/004 (2013.01); F02N 99/006 (2013.01); F02P 5/1506 (2013.01); *B60W 2710/021* (2013.01); *B60W 2710/0644* (2013.01); *F02D 2041/0092* (2013.01); *F02D 2041/0095* (2013.01); *F02N 11/0814* (2013.01); *F02N 2019/007* (2013.01); *Y02T 10/46* (2013.01); *Y02T 10/6221* (2013.01); *Y10S 903/93* (2013.01)

(58) Field of Classification Search
CPC ........ F02N 2019/007; F02N 2019/008; B60W 10/06; B60W 10/02
See application file for complete search history.

(56) References Cited

U.S. PATENT DOCUMENTS

| | | | | |
|---|---|---|---|---|
| 8,753,246 | B2* | 6/2014 | Huber | B60K 6/365 123/179.3 |
| 9,156,468 | B2* | 10/2015 | Ideshio | B60K 6/48 |
| 2001/0039230 | A1* | 11/2001 | Severinsky | B60H 1/004 477/3 |
| 2004/0060530 | A1* | 4/2004 | Mitani | F02N 11/08 123/179.3 |
| 2005/0109302 | A1* | 5/2005 | Tetsuno | F02D 41/042 123/179.5 |
| 2005/0115534 | A1* | 6/2005 | Tsuji | F02D 17/00 123/179.16 |
| 2007/0062476 | A1* | 3/2007 | Ota | F02B 23/104 123/179.4 |
| 2009/0105038 | A1 | 4/2009 | Weiss et al. | |
| 2011/0118915 | A1* | 5/2011 | Ortmann | B60K 6/48 701/22 |
| 2014/0249710 | A1* | 9/2014 | Nakanishi | B60K 6/48 701/22 |
| 2015/0059688 | A1* | 3/2015 | Kojima | F02D 37/02 123/305 |

FOREIGN PATENT DOCUMENTS

| | | |
|---|---|---|
| JP | 2004-028046 A | 1/2004 |
| JP | 2009-527411 A | 7/2009 |
| JP | 4638946 B2 | 2/2011 |

* cited by examiner

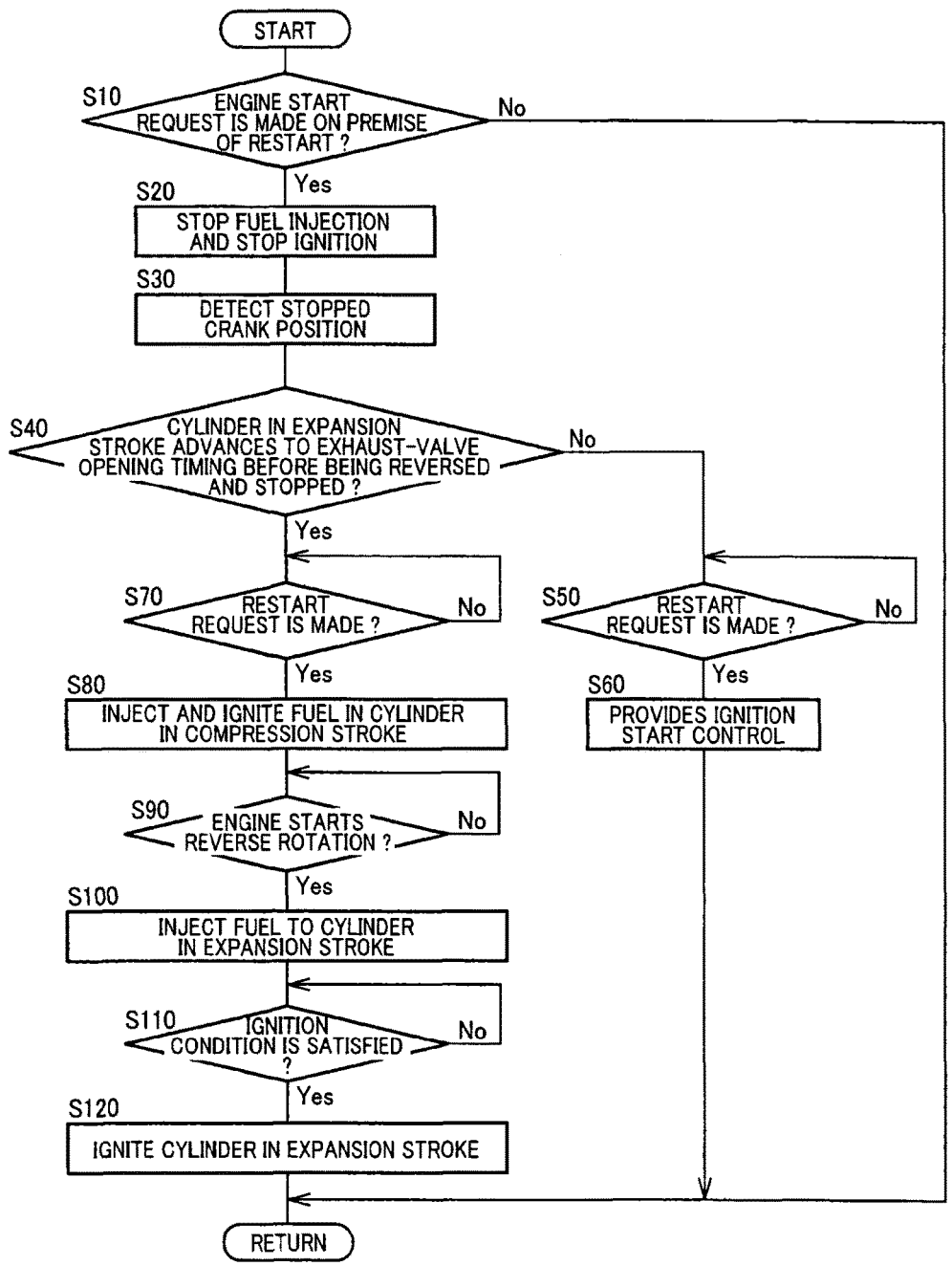

VEHICLE CONTROL DEVICE

TECHNICAL FIELD

The present invention relates to a control device of a vehicle including a clutch disposed on a power transmission path between an engine and an electric motor.

BACKGROUND ART

A vehicle is well known that includes an engine, an electric motor, and a clutch disposed on a power transmission path between the engine and the electric motor and capable of separating the engine from drive wheels. In such a vehicle, the engine is stopped while the clutch is released. Various techniques are proposed for starting the engine from such a state. For example, in a technique proposed in Patent Document 1, when a start of the engine is requested in a vehicle as described above, the clutch is slip-controlled to crank the engine by an output torque (synonymous with power and force if not particularly distinguished) of an electric motor so as to start the engine. In a technique proposed in Patent Document 2, at the engine start of a direct injection engine, fuel is injected and ignited in a cylinder of the engine stopped in an expansion stroke to increase an engine rotation speed by an explosion torque so as to perform a so-called ignition start.

PRIOR ART DOCUMENT

Patent Documents

Patent Document 1: Japanese Unexamined Patent Application Publication (Translation of PCT Application) No. 2009-527411
Patent Document 2: Japanese Laid-Open Patent Publication No. 2004-28046

SUMMARY OF THE INVENTION

Problem to Be Solved by the Invention

The ignition start in a cylinder stopped in the expansion stroke may not be capable of achieving an explosion torque sufficient for overcoming a friction torque of the engine to increase the engine rotation speed, depending on an oxygen concentration in the cylinder. For example, opening of an exhaust valve of the cylinder in the expansion stroke reduces the oxygen concentration in the cylinder due to a backward flow of exhaust gas and may lead to a misfire without combustion or only enable generation of a small explosion torque in an atmospheric pressure state. Therefore, the engine startability of the ignition start may decrease. The problem as described above is unknown and no proposal has hitherto been made on properly achieving a high explosion torque at the time of a first explosion of a cylinder in the expansion stroke.

The present invention was conceived in view of the situations and it is therefore an object of the present invention to provide a control device of a vehicle capable of improving the engine startability at the engine start by the ignition start.

Means for Solving the Problem

To achieve the object, the first aspect of the invention provides a control device of a vehicle including (a) an engine, an electric motor, and a clutch disposed on a power transmission path between the engine and the electric motor, the control device of a vehicle performing an ignition start causing combustion in a cylinder of the engine to rotate the engine at a start of the engine, the control device of a vehicle (b) switching a cylinder in which combustion is first caused in the engine based on an actuation during a rotation stop process of the engine of an exhaust valve in a cylinder stopped in an expansion stroke, when performing the ignition start at the start of the engine.

Effects of the Invention

Consequently, when a cylinder in the expansion stroke is in a state in which a high explosion torque is generated by the ignition start, the ignition start can be performed in the cylinder in the expansion stroke. In other words, if a cylinder in the expansion stroke is in a state in which a high explosion torque is generated even when the combustion is caused first in the cylinder, the combustion is caused first in the cylinder in the expansion stroke. On the other hand, if an oxygen concentration is reduced in a cylinder in the expansion stroke, the combustion is not caused first in the cylinder in the expansion stroke, and the combustion is caused first in a cylinder other than the cylinder in the expansion stroke to put the cylinder in the expansion stroke into a state in which a high explosion torque is generated before causing the combustion in the cylinder in the expansion stroke. Therefore, the engine startability can be improved at the engine start by the ignition start.

The second aspect of the invention provides the control device of the vehicle recited in the first aspect of the invention, wherein when the exhaust valve of the cylinder stopped in the expansion stroke is temporarily opened because rotational position of the engine advances beyond a rotation stop state during the rotation stop process of the engine, the control device of the vehicle performs a reversal start causing combustion first in a cylinder stopped in a compression stroke to negatively rotate the engine before causing combustion in the cylinder in the expansion stroke to positively rotate the engine, and wherein when the exhaust valve of the cylinder stopped in the expansion stroke is not temporarily opened, the control device of the vehicle causes combustion first in the cylinder stopped in the expansion stroke to positively rotate the engine. As a result, the cylinder in the expansion stroke is compressed by the negative rotation of the engine due to the combustion caused first in the cylinder stopped in the compression stroke and, therefore, even when a cylinder in the expansion stroke has an oxygen concentration in the cylinder reduced because the exhaust valve is temporarily opened, a high explosion torque can be acquired at the time of the first explosion of the cylinder. The reversal start causes the combustion in the cylinder containing a large amount of exhaust gas after the first explosion of the cylinder in the expansion stroke and, therefore, the explosion torque at the time of combustion in the cylinder is made smaller. Since the explosion torque is suppressed in this way and the increase in the engine rotation speed is slowed, the occurrence of overshoot of the engine rotation speed exceeding an electric motor rotation speed is suppressed and the clutch is promptly completely engaged. On the other hand, the sufficient explosion torque can be acquired at the first explosion even if the combustion is caused first in the cylinder in the expansion stroke without temporary opening of the exhaust valve. Therefore, the engine startability can be improved at the engine start by the ignition start.

The third aspect of the invention provides the control device of the vehicle recited in the second aspect of the invention, wherein fuel is injected to the cylinder in the expansion stroke while the engine is negatively rotating during the reversal start. As a result, the fuel is injected while an airflow occurs in the cylinder due to the negative rotation, facilitating the homogenization of air-fuel mixture in the cylinder in the expansion stroke. Therefore, because the first explosion itself easily occurs in the cylinder in the expansion stroke and a high explosion torque is more easily acquired at the first explosion, the engine startability can be improved.

The fourth aspect of the invention provides the control device of the vehicle recited in the second or third aspects of the invention, wherein during the reversal start, the cylinder in the expansion stroke is ignited before the cylinder in the expansion stroke reaches a top dead center and when during the reversal start, engine rotation speed in a negative direction is reduced in speed. As a result, the combustion is caused in an advanced state of air compression in the cylinder in the expansion stroke. The first explosion in the cylinder in the expansion stroke is generated while the reaction torque associated with the negative rotation of the engine is small. Therefore, because the first explosion itself easily occurs in the cylinder in the expansion stroke and a high explosion torque is more easily acquired at the first explosion, the reversal start is properly performed and the engine startability can be more improved.

The fifth aspect of the invention provides the control device of a vehicle recited in any one of the first to fourth aspects of the invention, wherein the clutch is controlled toward engagement to increase the engine rotation speed after the engine positively rotates. As a result, the ignition start is performed first to suppress an output torque of the electric motor when the clutch is controlled toward engagement. Therefore, during a motor running, the output torque of the electric motor secured for the engine start is suppressed and a motor running region is expanded. Since the occurrence of the overshoot is suppressed during the reversal start, the clutch is promptly completely engaged. Thus, the engine startability can be improved at the engine start by the ignition start.

BRIEF DESCRIPTION OF THE DRAWINGS

FIG. 7 is a flowchart for explaining a main portion of the control operation of the electronic control device, i.e., the control operation for improving the engine startability at the engine start by the ignition start.

MODE FOR CARRYING OUT THE INVENTION

In the present invention, preferably, the engine is an internal combustion engine such as a gasoline engine generating power from combustion of fuel, for example. Particularly, the engine is a four-cylinder engine that is a direct injection four-cycle engine directly injecting fuel into cylinders. As a result, although a four-cylinder engine tends to cause a phenomenon in which an exhaust valve of a cylinder stopped in the expansion stroke is temporarily opened to result in a reduction in the oxygen concentration in the cylinder because the rotational position of the engine advances in a rotation stop process beyond a rotation stop state, any one of the first to fifth aspects of the invention can be applied to this four-cylinder engine to improve the engine startability at the engine start by the ignition start.

Preferably, the vehicle includes a transmission making up a portion of a power transmission path between the electric motor and drive wheels. The transmission may be a manual transmission such as a known synchronous meshing type parallel two-shaft transmission including a plurality of pairs of always meshing change gears between two shafts or one of various automatic transmissions (such as a planetary gear type automatic transmission, a synchronous meshing type parallel two-shaft automatic transmission, a DCT, and a CVT). This automatic transmission is made up of a single automatic transmission, an automatic transmission having a fluid power transmission device, or an automatic transmission having an auxiliary transmission. The clutch is a wet or dry engagement device capable of separating the engine from the drive wheels.

An example of the present invention will now be described in detail with reference to the drawings.

EXAMPLE

Figure 1:
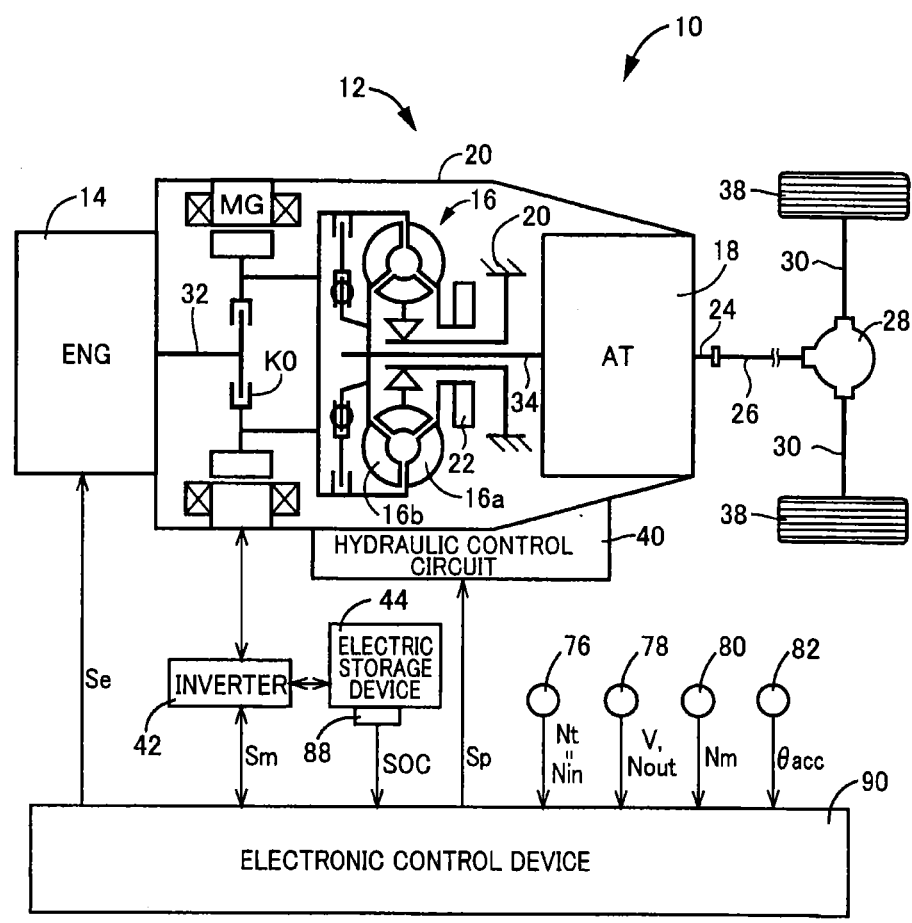
FIG. 1 is a diagram for explaining a general configuration of a power transmission device included in a vehicle to which the present invention is applied, and is a diagram for explaining a main portion of a control system in the vehicle.
Figure 2:
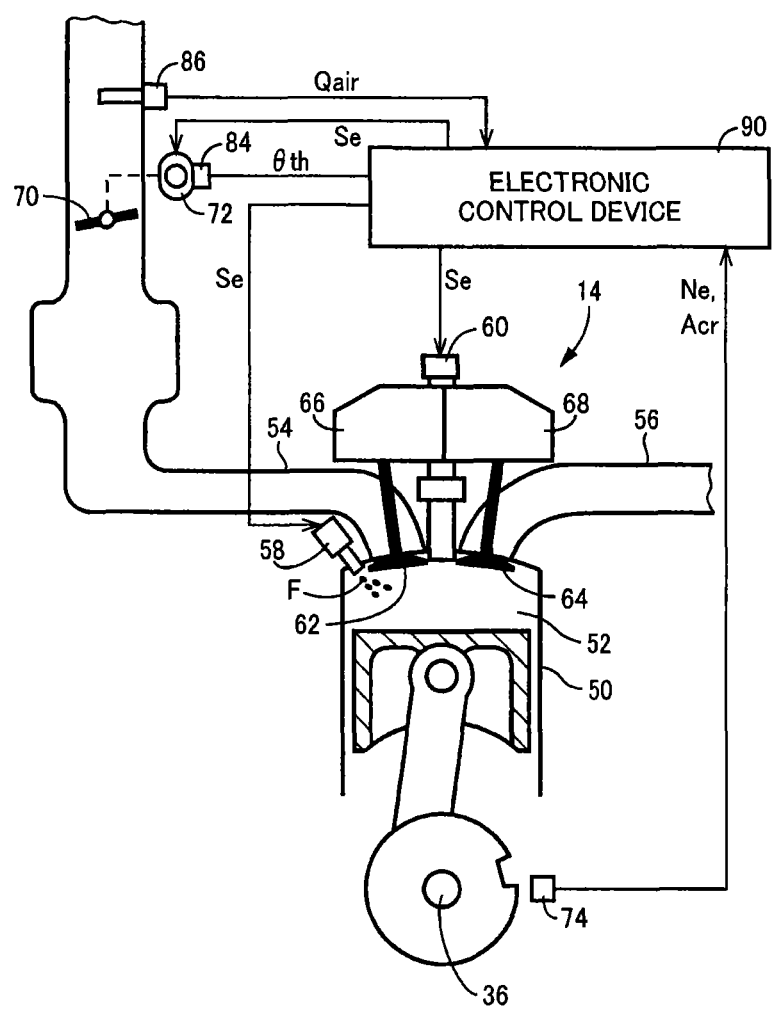
FIG. 2 is a diagram for explaining a general configuration of an engine of FIG. 1 and is a diagram for explaining a main portion of a control system in the engine out of the control system in the vehicle.

FIG. 1 is a diagram for explaining a general configuration of a power transmission device 12 included in a vehicle 10 to which the present invention is applied, and is a diagram for explaining a main portion of a control system for various types of control in the vehicle 10. FIG. 2 is a diagram for explaining a general configuration of an engine 14 of FIG. 1 and is a diagram for explaining a main portion of a control system for output control etc., in the engine 14 out of the control system in the vehicle 10.

In FIG. 1, the vehicle 10 is a hybrid vehicle including the engine 14 and an electric motor MG acting as drive force sources for running. The power transmission device 12 includes in a transmission case 20 acting as a non-rotating member, an engine connecting/disconnecting clutch K0 (hereinafter referred to as a clutch K0), a torque converter 16, and an automatic transmission 18 in order from the engine 14 side. The power transmission device 12 also includes a propeller shaft 26 coupled to a transmission output shaft 24 that is an output rotating member of the automatic transmission 18, a differential gear 28 coupled to the propeller shaft 26, a pair of axles 30 coupled to the differential gear 28, etc. A pump impeller 16a of the torque converter 16 is coupled via the clutch K0 to an engine coupling shaft 32 and is directly coupled to the electric motor MG A turbine impeller 16b of the torque converter 16 is directly coupled to a transmission input shaft 34 that is an input rotating member of the automatic transmission 18. The pump impeller 16a is coupled to a mechanical oil pump 22 rotationally driven by the engine 14 (and/or the electric motor MG) to generate a hydraulic oil pressure for providing shift control of the automatic transmission 18 and engagement/release control of the clutch K0. The power transmission device 12 configured as described above is preferably used in the vehicle 10 of the FR type, for example. In the power transmission device 12, if the clutch K0 is engaged, the power (synonymous with torque and force if not particularly distinguished) of the engine 14 is transmitted from the engine coupling shaft 32 coupling a crankshaft 36 (see FIG. 2) of the engine 14 and the clutch K0, sequentially through the clutch K0, the torque converter 16, the automatic transmission 18, the propeller shaft 26, the differential gear 28, the pair of the axles 30, etc., to a pair of drive wheels 38. As described above, the power transmission device 12 makes up a power transmission path from the engine 14 to the drive wheels 38.

The automatic transmission 18 is a transmission making up a portion of the power transmission path from the engine 14 and the electric motor MG to the drive wheels 38 to transmit the power from the drive force source for running (the engine 14 and the electric motor MG) toward the drive wheels 38. The automatic transmission 18 is, for example, a known planetary gear type multistage transmission having a plurality of shift stages of different gear ratios γ(=transmission input rotation speed Nin/transmission output rotation speed Nout) selectively established, or a known continuously variable transmission having a gear ratio γ continuously varied in a stepless manner.

The electric motor MG is a so-called motor generator having a function of a motor generating mechanical power from electric energy and a function of an electric generator generating electric energy from mechanical energy. The electric motor MG generates power for running, instead of the engine 14 or in addition to the engine 14, from electric energy supplied via an inverter 42 from an electric storage device 44. The electric motor MG converts the power of the engine 14 or a driven force input from the drive wheels 38 side into electric energy through regeneration to accumulate the electric energy via the inverter 42 into the electric storage device 44. The electric motor MG is coupled to a power transmission path between the clutch K0 and the torque converter 16 and the power is mutually transmitted between the electric motor MG and the pump impeller 16a. Therefore, the electric motor MG is coupled to the transmission input shaft 34 of the automatic transmission 18 in a power transmittable manner without going through the clutch K0.

The clutch K0 is a wet multi-plate type hydraulic friction engagement device, for example, and is subjected to engagement/release control by a hydraulic control circuit 40 using an oil pressure generated by the oil pump 22 as an original pressure. In the engagement/release control, a torque capacity of the clutch K0 (hereinafter referred to as a K0 torque) is varied through pressure adjustment of a linear solenoid valve etc. in the hydraulic control circuit 40, for example. In an engaged state of the clutch K0, the pump impeller 16a and the engine 14 are integrally rotated via the engine coupling shaft 32. On the other hand, in a released state of the clutch K0, power transmission between the engine 14 and the pump impeller 16a is disconnected. In particular, the clutch K0 is released to separate the engine 14 from the drive wheels 38. Since the electric motor MG is coupled to the pump impeller 16a, the clutch K0 also acts as a clutch disposed on the power transmission path between the engine 14 and the electric motor MG to connect/disconnect the power transmission path.

In FIG. 2, the engine 14 is a known direct injection four-cycle gasoline engine directly injecting fuel into each cylinder 50, for example. The engine 14 includes a combustion chamber 52 disposed between a cylinder head and a piston, an intake pipe 54 connected to an intake port of the combustion chamber 52, an exhaust pipe 56 connected to an exhaust port of the combustion chamber 52, a fuel injection device 58 provided in the cylinder head and directly injecting fuel F into the combustion chamber 52, an ignition device 60 igniting an air-fuel mixture in the combustion chamber 52, an intake valve 62 opening or closing the intake port of the combustion chamber 52, an exhaust valve 64 opening or closing the exhaust port of the combustion chamber 52, an intake valve drive device 66 reciprocating the intake valve 62 in synchronization with rotation of the crankshaft 36 for opening/closing actuation of the intake valve 62, and an exhaust valve drive device 68 reciprocating the exhaust valve 64 in synchronization with the rotation of the crankshaft 36 for opening/closing actuation of the exhaust valve 64.

An electronic throttle valve 70 is provided in the intake pipe 54 of the engine 14 and the electronic throttle valve 70 is actuated to open/close by a throttle actuator 72. In the engine 14, the fuel F is injected and supplied from the fuel injection device 58 into the intake air sucked from the intake pipe 54 into the combustion chamber 52 to form the air-fuel mixture, and the air-fuel mixture is ignited and combusted by the ignition device 60. As a result, the engine 14 is driven and the air-fuel mixture after the combustion is sent out as the exhaust gas into the exhaust pipe 56.

Figure 3:
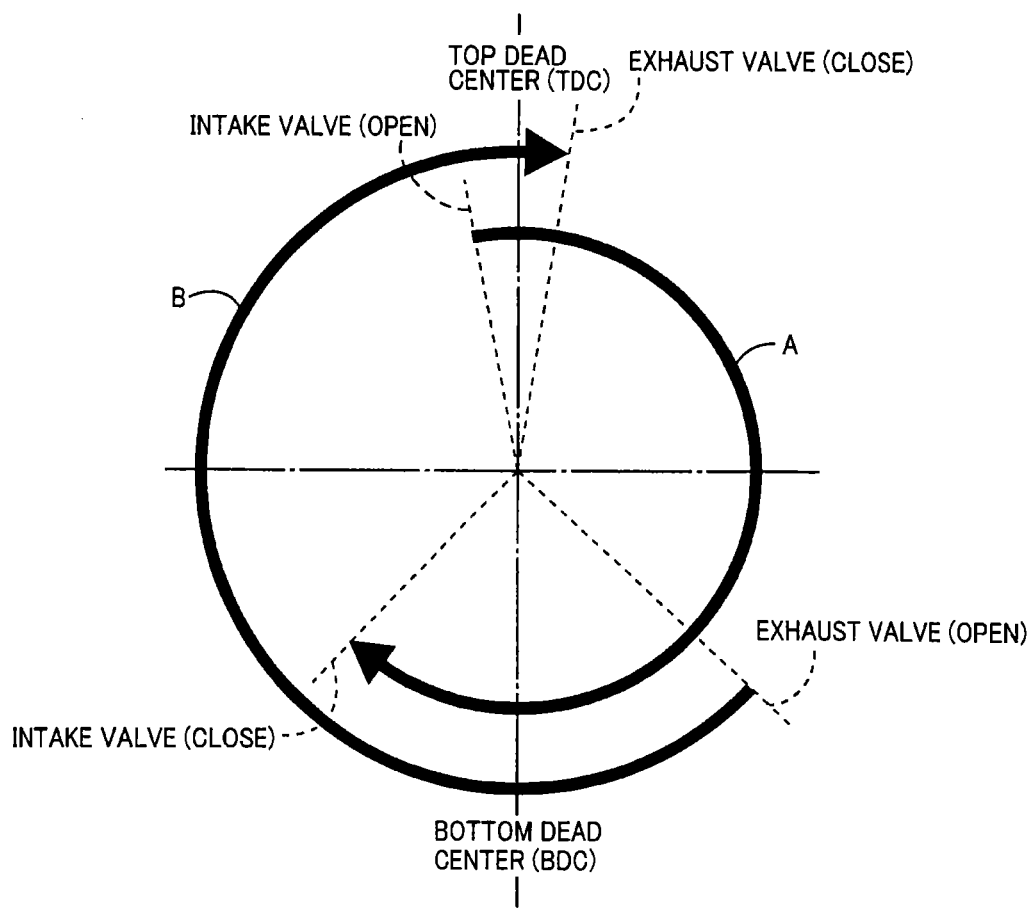
FIG. 3 is a diagram for explaining a valve opening timing of an intake valve and a valve opening timing of an exhaust valve.

FIG. 3 is a diagram for explaining a valve opening timing VTin of the intake valve 62 and a valve opening timing VTex of the exhaust valve 64. In FIG. 3, an arrow A indicates the valve opening timing VTin of the intake valve 62, i.e., a range of a crank angle Acr in which the intake valve 62 is opened. An arrow B indicates the valve opening timing VTex of the exhaust valve 64, i.e., a range of the crank angle Acr in which the exhaust valve 64 is opened. The valve opening timing VT in this example is a period during opening of a valve (a valve opening period) from a time point when the valve opens (a valve opening time point) to a time point when the valve closes (a valve closing time point), and is not indicative of the valve opening time point.

Returning to FIGS. 1 and 2, the vehicle 10 includes an electronic control device 90 including a control device of the vehicle 10 related to the engagement/release control of the clutch K0 and start control of the engine 14, for example. The electronic control device 90 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various types of control of the vehicle 10. For example, the electronic control device 90 provides the output control of the engine 14, drive control of the electric motor MG including regenerative control of the electric motor MG, the shift control of the automatic transmission 18, torque capacity control of the clutch K0, etc., and is configured separately as needed for engine control, electric motor control, hydraulic control, etc. As depicted in FIGS. 1 and 2, the electronic control device 90 is supplied with each of various signals (e.g., an engine rotation speed Ne that is a rotation speed of the engine 14 and the crank angle Acr, a turbine rotation speed Nt, i.e., the transmission input rotation speed Nin that is a rotation speed of the transmission input shaft 36, the transmission output rotation speed Nout that is a rotation speed of the transmission output shaft 24 corresponding to a vehicle speed V, an electric motor rotation speed Nm that is a rotation speed of the electric motor MG, an accelerator opening degree θacc corresponding to a drive demand amount to the vehicle 10 from a driver, a throttle valve opening degree θth indicative of an opening angle of the electronic throttle valve 70, an intake air amount Qair of the engine 14, and a state of charge (charging capacity) SOC of the electric storage device 44) based on detection values from various sensors (e.g., an engine rotation speed sensor 74, a turbine rotation speed sensor 76, an output shaft rotation speed sensor 78, an electric motor rotation speed sensor 80, an accelerator opening degree sensor 82, a throttle sensor 84, an air flow meter 86, and a battery sensor 88). As depicted in FIGS. 1 and 2, the electronic control device 90 outputs, for example, an engine output control command signal Se for the output control of the engine 14, an electric motor control command signal Sm for controlling the operation of the electric motor MG, and an oil pressure command signal Sp for actuating an electromagnetic valve (solenoid valve) etc. included in the hydraulic control circuit 40 for controlling hydraulic actuators of the clutch K0 and the automatic transmission 18, to engine control devices such as the fuel injection device 58, the ignition device 60, and the throttle actuator 72, the inverter 42, and the hydraulic control circuit 40, respectively.

Figure 4:
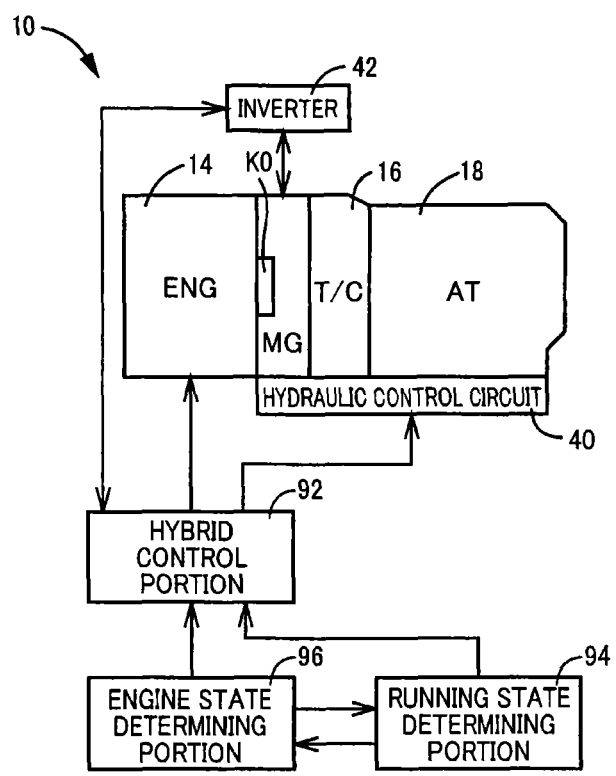
FIG. 4 is a functional block diagram for explaining a main portion of the control function of an electronic control device.

FIG. 4 is a functional block diagram for explaining a main portion of the control function of the electronic control device 90. In FIG. 4, a hybrid control means, i.e., a hybrid control portion 92, has a function as an engine drive control portion controlling the drive of the engine 14 and a function as an electric motor operation control portion controlling the operation of the electric motor MG as a drive force source or an electric generator through the inverter 42, and provides control of the hybrid drive by the engine 14 and the electric motor MG through these control functions. For example, the hybrid control portion 92 calculates a demand drive force Fdtgt as a drive demand amount to the vehicle 10 from a driver based on the accelerator opening degree θacc and the vehicle speed V. The hybrid control portion 92 outputs the command signals (the engine output control command signal Se and the electric motor control command signal Sm) controlling the drive force source for running so as to achieve the output of the drive force source for running (the engine 14 and the electric motor MG) such that the demand drive force Fdtgt is acquired in consideration of a transmission loss, an accessory load, the gear ratio γ of the automatic transmission 18, the charging capacity SOC of the electric storage device 44, etc. The drive demand amount can be implemented by using not only the demand drive force Fdtgt [N] at the drive wheels 38 but also a demand drive torque [Nm] at the drive wheels 38, a demand drive power [W] at the drive wheels 38, a demand transmission output torque at the transmission output shaft 24, etc. The drive demand amount can be implemented by simply using the accelerator opening degree θacc [%], the intake air amount Qair [g/sec], etc.

Specifically, for example, if the demand drive force Fdtgt is within a range that can be covered solely by the output of the electric motor MG, the hybrid control portion 92 performs a motor running mode (EV running mode) performed by using only the electric motor MG as the drive force source for running while the clutch K0 is released. On the other hand, for example, if the demand drive force Fdtgt is within a range that cannot be covered unless at least the output of the engine 14 is used, the hybrid control portion 92 performs an engine running mode, i.e., a hybrid running mode (EHV running mode), performed by using at least the engine 14 as the drive force source for running with the clutch K0 being engaged. If the EV running mode cannot be performed because discharge of the electric storage device 44 is limited based on, for example, the charging capacity SOC or a dischargeable electric power calculated from an electric storage device temperature, if charging of the electric storage device 44 is requested, or if the engine 14 or equipment related to the engine 14 must be warmed up, the hybrid control portion 92 causes the engine 14 to operate.

In a method of starting the engine 14 by the hybrid control portion 92, for example, the engine 14 is started by initiating fuel supply, engine ignition, etc., while the released clutch K0 is controlled toward engagement to crank the engine 14 by the electric motor MG. In this start method, the clutch K0 is controlled to acquire the K0 torque for transmitting an engine start torque that is a torque required for the engine start toward the engine 14. Since the engine start torque corresponds to an MG torque Tm going through the clutch K0 toward the engine 14, an MG torque Tm going toward the drive wheels 38 is accordingly reduced. Therefore, to suppress a drop in the drive torque in this start method, the MG torque is increased by an amount corresponding to the K0 torque for transmitting the engine start torque toward the engine 14 in addition to the MG torque Tm required for satisfying the demand drive torque (hereinafter, this increased amount is referred to as a K0 compensation torque (or an MG compensation torque).

In the EV running mode of this example, an EV running region is reduced by an amount of the MG compensation torque secured in preparation for the engine start from the maximum MG torque Tm that can be output by the electric motor MG From another viewpoint, if the MG compensation torque can be suppressed, the EV running region can be expanded. Therefore, the hybrid control portion 92 performs the ignition start causing combustion in a cylinder of the engine 14 to rotate the engine 14 at the engine start, in addition to the start method in which the clutch K0 is controlled toward engagement. The hybrid control portion 92 is allotted a portion of the engine start torque by performing the ignition start. In the engine start method using the ignition start, for example, fuel is injected and ignited (fired) in a cylinder of the engine 14 stopped in the expansion stroke to cause combustion in the cylinder, and a piston is pushed down by the generated explosion torque to rotate the crankshaft 36, thereby starting the engine 14.

If a portion of the engine start torque is covered by the ignition start, the ignition start is preferably performed for moving a stopped piston. In other words, it is preferred to use the explosion torque associated with the ignition start to overcome (exceed) the friction torque of the engine 14 at the initiation of the engine start for suppression of the MG compensation torque. Therefore, if a restart of the engine 14 is requested during the EV running mode, the hybrid control portion 92 first performs the ignition start to rotate the engine 14. The hybrid control portion 92 then controls the clutch K0 toward engagement to increase the engine rotation speed Ne by the electric motor MG. After the engine rotation speed Ne synchronizes with the electric motor rotation speed Nm, the hybrid control portion 92 completely engages the clutch K0 and shifts to the EHV running mode. The friction torque of the engine 14 at the engine start is a total torque of a compression torque corresponding to a pumping loss, a mechanical friction torque corresponding to sliding resistance, and a mechanical friction torque of the intake valve drive device 66 and the exhaust valve drive device 68. However, the friction torque of the engine 14 at the initiation of the engine start when the stopped piston is moved, corresponds solely to the sliding resistance and the mechanical friction torque of the intake valve drive device 66 etc., since the engine rotation speed Ne is extremely low.

Figure 5A:
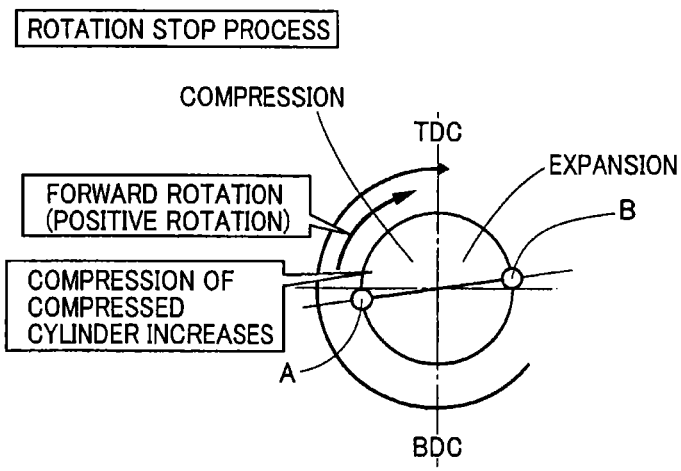
FIGS. 5A to 5D are diagrams for explaining an example of behavior in a rotation stop process of the engine, exemplarily illustrating a four-cylinder engine.
Figure 5B:
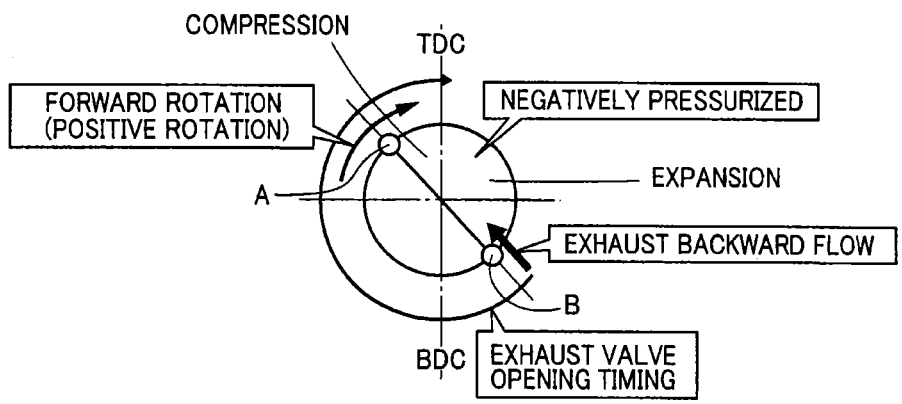
Figure 5C:
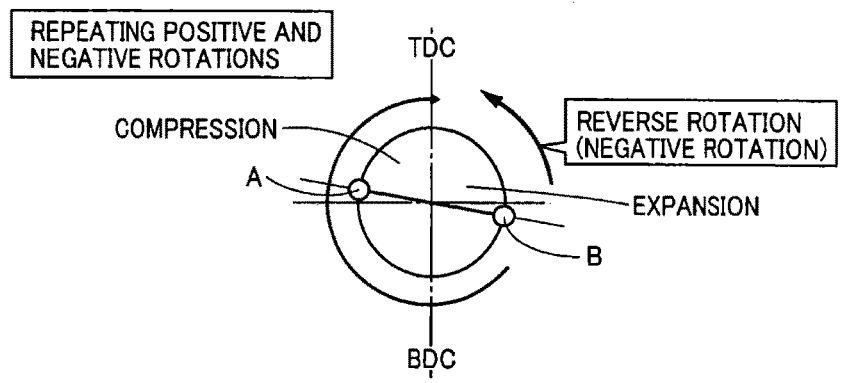
Figure 5D:
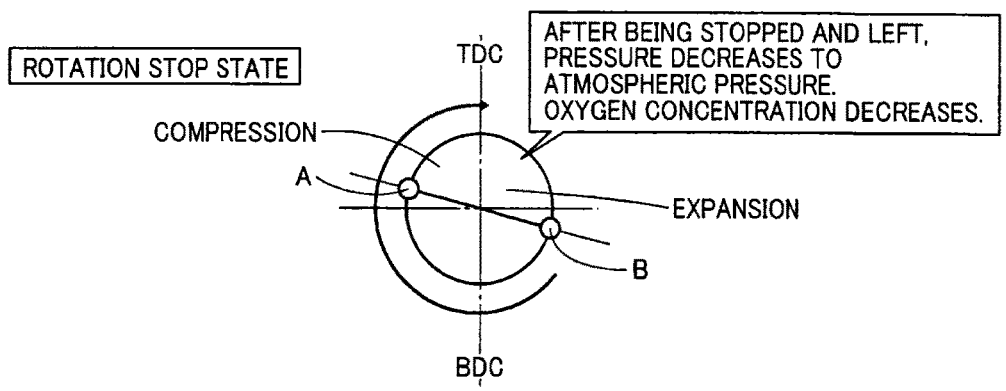

At the start of the engine 14, even when combustion is first executed by the ignition start in the cylinder stopped in the expansion stroke, the expansion torque sufficient for overcoming the friction torque of the engine 14 may not be generated. FIGS. 5A to 5D are diagrams for explaining an example of behavior of the engine 14 in a rotation stop process thereof, exemplarily illustrating a four-cylinder engine. In FIG. 5 FIGS. 5A to 5D, as depicted in FIG. 5A, in a process of stopping rotation at the stop of the engine, the rotation of the engine 14 in the positive direction (positive rotation) is continued toward a rotation stop while a cylinder A in the compression stroke is increasingly compressed. As depicted in FIG. 5B, an overshoot may occur, resulting in the rotation of the engine 14 advancing beyond a rotation stop state of the engine 14. If such an overshoot allows the engine to rotate to reach a position corresponding to the valve opening timing VTex of the exhaust valve 64, the exhaust valve 64 is opened in a cylinder B in the expansion stroke, allowing the exhaust to flow backward into the cylinder. Subsequently, as depicted in FIG. 5C, the engine 14 is rotated in the negative direction (negative rotation) so that the positive rotation and the negative rotation are repeated until the rotation stop state. Finally, as depicted in FIG. 5D, the rotation of the engine 14 is stopped. In the rotation stop state of the engine 14 as depicted in FIG. 5D, the cylinder B stopped in the expansion stroke has a pressure in the cylinder reduced to the atmospheric pressure when a certain time has elapsed immediately after the stop. The cylinder B stopped in the expansion stroke has an oxygen concentration in the cylinder reduced by the backward flow of the exhaust due to the overshoot in the rotation stop process. Therefore, the ignition start in the cylinder B stopped in the expansion stroke is performed by fuel injection and ignition at the low oxygen concentration in the atmospheric pressure state and therefore may result in a misfire without combustion or may not generate a sufficient explosion torque even if combustion is achieved. For example, assuming that the positive rotation is the rotation when the engine 14 is rotationally driven during vehicle running, the negative rotation of the engine 14 is the rotation in the direction opposite to the positive rotation. Therefore, the negative rotation of the engine 14 means that the engine 14 is rotated in the reverse direction. The behavior as described above may occur in the rotation stop process of the engine 14 particularly in the case of the rotation stop process in a four-cylinder engine.

If the exhaust valve 64 of a cylinder stopped in the expansion stroke is not temporarily opened due to the overshoot in the rotation stop process of the engine 14, the hybrid control portion 92 performs the ignition start causing combustion first in the cylinder stopped in the expansion stroke so as to positively rotate the engine 14. On the other hand, if the exhaust valve 64 of a cylinder stopped in the expansion stroke is temporarily opened due to the overshoot in the rotation stop process of the engine 14, the hybrid control portion 92 performs the ignition start using a reversal start causing combustion first in a cylinder stopped in the compression stroke to negatively rotate the engine 14 before causing combustion in the cylinder in the expansion stroke to positively rotate the engine 14. As described above, the hybrid control portion 92 switches the cylinder in which combustion is first caused in the engine 14 based on the actuation of the exhaust valve 64 in the rotation stop process of the engine 14 in the cylinder stopped in the expansion stroke when performing the ignition start at the start of the engine 14. Once the engine 14 positively rotates in the ignition start, the hybrid control portion 92 controls the clutch K0 toward engagement to increase the engine rotation speed Ne.

Figure 6A:
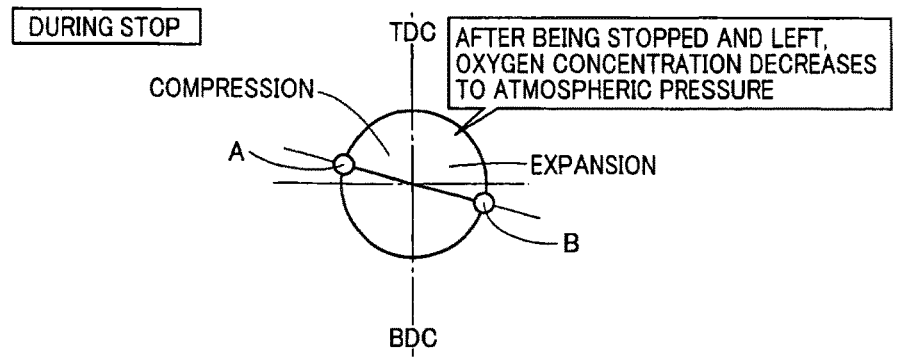
FIGS. 6A to 6C are diagrams for explaining the ignition start using the reversal start performed at the stop of the engine accompanied with the overshoot.
Figure 6B:
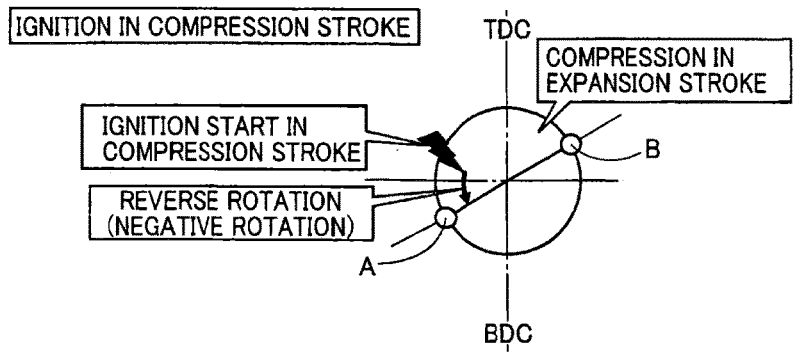
Figure 6C:
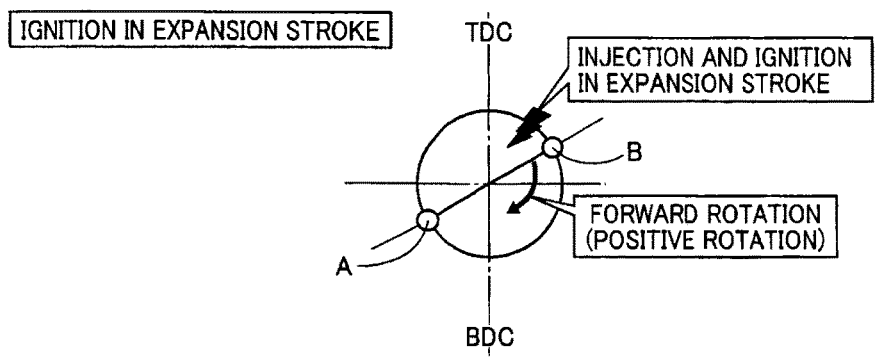

FIGS. 6A to 6C are diagrams for explaining the ignition start using the reversal start performed at the stop of the engine accompanied with the backward flow of exhaust due to the overshoot, exemplarily illustrating a four-cylinder engine. In FIGS. 6A to 6C, FIG. 6A depicts a state equivalent to the rotation stop state of the engine 14 as depicted in FIG. 5D, and the cylinder B stopped in the expansion stroke is at the low oxygen concentration in the atmospheric pressure state. In such a case, as depicted in FIG. 6B, the hybrid control portion 92 performs the ignition start to cause combustion in the cylinder A stopped in the compression stroke, thereby negatively rotating the engine 14. As a result, air is compressed in the cylinder B in the expansion stroke. Subsequently, as depicted in FIG. 6C, the hybrid control portion 92 performs the ignition start to cause combustion in the cylinder B while the cylinder B in the expansion stroke is in a compressed state, thereby positively rotating the engine 14. This leads to the generation of the explosion torque sufficient for overcoming the friction torque of the engine 14. In this case, assuming that the explosion in the cylinder B is a first explosion, a second explosion occurs in the cylinder A containing a large amount of exhaust gas because the ignition start is already performed and, therefore, the increase in the engine rotation speed Ne is slowed to suppress the occurrence of overshoot of the engine rotation speed Ne exceeding the electric motor rotation speed Nm. Thus, the timing of the complete engagement of the clutch K0 is made earlier and a shift to the EHV running mode is promptly achieved. Therefore, the startability of the engine 14 is improved and, additionally, the acceleration responsiveness and the drivability are improved.

When the engine 14 is negatively rotating due to the ignition start in the cylinder A, air in the combustion chamber 52 is flowing in the cylinder B in the expansion stroke. Therefore, the hybrid control portion 92 injects fuel into the cylinder B in the expansion stroke while the engine 14 is negatively rotating during the reversal start. This facilitates the homogenization of air-fuel mixture in the combustion chamber 52 of the cylinder B in the expansion stroke and the sufficient expansion torque is generated.

It is considered that the compression of the cylinder B in the expansion stroke due to the negative rotation of the engine 14 is maximized when the negative rotation is stopped. It is also considered that when the negative rotation is stopped, the reaction force to the force causing the positive rotation is zero. Therefore, during the reversal start, the hybrid control portion 92 ignites the cylinder B in the expansion stroke before the cylinder B in the expansion stroke reaches top dead center (TDC) when the negative rotation of the engine 14 is reduced in speed (e.g., when the speed of the negative rotation comes close to zero or when the negative rotation stops). As a result, the combustion is caused in the cylinder B in the expansion stroke when the air is compressed as much as possible, and the sufficient explosion torque is generated. The combustion is caused in the cylinder B in the expansion stroke when the reaction torque is suppressed as much as possible, and the engine 14 is properly positively rotated. In other words, the reversal start is properly performed.

More specifically, returning to FIG. 4, a running state determining means, i.e., a running state determining portion 94 determines whether an engine stop request is made that requests a stop of the engine 14 on the premise of a restart, for example. For example, if the demand drive force Fdtgt falls within a range that can be covered solely by the output of the electric motor MG during the EHV running mode or if a discharge limitation to the electric storage device 44, a charge request to the electric storage device 44, or a warm-up request to the engine 14 etc. is canceled and the EV running mode is performed, the running state determining portion 94 determines that the engine stop request on the premise of a restart is made.

The running state determining portion 94 determines whether an engine restart request is made that requests a restart of the temporarily stopped engine 14, for example. For example, if the demand drive force Fdtgt falls within a range that cannot be covered unless at least the output of the engine 14 is used, if the discharge limitation to the electric storage device 44 is made, or if the charge request to the electric storage device 44 is made, during the EV running mode, the running state determining portion 94 determines that the engine restart request is made.

For example, if the running state determining portion 94 determines that the engine stop request is made on the premise of a restart or if the running state determining portion 94 determines that the engine restart request is made, an engine state determining means, i.e., an engine state determining portion 96 determines whether the exhaust valve 64 of a cylinder stopped in the expansion stroke is temporarily opened due to the overshoot in the rotation stop process of the engine 14. In other words, the engine state determining portion 96 determines whether the cylinder stopped in the expansion stroke is advanced to the valve opening timing VTex of the exhaust valve 64 in the rotation stop process of the engine 14 before the engine 14 is rotated in the reverse direction and stopped.

The engine state determining portion 96 determines whether the engine 14 actually starts rotating in the reverse direction due to initiation of the reversal start by the hybrid control portion 92, for example. The engine state determining portion 96 also determines whether after fuel injection to a cylinder in the expansion stroke performed during the reversal start by the hybrid control portion 92, a condition of ignition in the cylinder in the expansion stroke is satisfied, for example. In other words, the engine state determining portion 96 determines whether the ignition in the cylinder in the expansion stroke is enabled. The condition of ignition is that the cylinder in the expansion stroke does not yet reach the TDC while the negative rotation of the engine is reduced in speed or stopped during reverse rotation of the engine 14, for example.

If the running state determining portion 94 determines that the engine restart request is made and the engine state determining portion 96 determines that the cylinder stopped in the expansion stroke is advanced to the valve opening timing VTex of the exhaust valve 64 in the rotation stop process of the engine 14 before the engine 14 is rotated in the reverse direction and stopped, the hybrid control portion 92 performs the ignition start using the reversal start.

FIG. 7 is a flowchart for explaining a main portion of the control operation of the electronic control device 90, i.e., the control operation for improving the engine startability at the engine start by the ignition start, and is repeatedly executed with an extremely short cycle time, for example, on the order of a few msec to a few tens of msec.

In FIG. 7, first, at step (hereinafter, step will be omitted) S10 corresponding to the running state determining portion 94, it is determined whether an engine stop request is made on the premise of a restart, for example. If the determination of S10 is negative, this routine is terminated and, if affirmative, for example, both the fuel injection and the ignition for the engine 14 are stopped at S20 corresponding to the hybrid control portion 92. At S30 corresponding to the engine state determining portion 96, for example, the crank angle Acr of the stopped engine 14 is detected. At S40 corresponding to the engine state determining portion 96, it is determined whether the cylinder stopped in the expansion stroke is advanced to the valve opening timing VTex of the exhaust valve 64 in the rotation stop process of the engine 14 before the engine 14 is rotated in the reverse direction and stopped, for example. If the determination of S40 is negative, it is determined at S50 corresponding to the running state determining portion 94 whether an engine restart request is made, for example. If the determination of S50 is negative, S50 is repeatedly executed and, if affirmative, for example, the ignition start is performed first in the cylinder stopped in the expansion stroke at S60 corresponding to the hybrid control portion 92. On the other hand, if the determination of S40 is affirmative, it is determined at S70 corresponding to the running state determining portion 94 whether an engine restart request is made, for example. If the determination of S70 is negative, S70 is repeatedly executed and, if affirmative, for example, the fuel injection and the ignition are performed for the cylinder stopped in the compression stroke to initiate the reversal start at S80 corresponding to the hybrid control portion 92. At S90 corresponding to the engine state determining portion 96, it is determined whether the engine 14 starts rotating in the reverse direction, for example. If the determination of S90 is negative, S90 is repeatedly executed and, if affirmative, for example, the fuel injection is performed for a cylinder in the expansion stroke at S100 corresponding to the hybrid control portion 92. At S110 corresponding to the engine state determining portion 96, it is determined whether the condition of ignition in the cylinder in the expansion stroke is satisfied, for example. If the determination of S110 is negative, S110 is repeatedly executed and, if affirmative, for example, the ignition is performed for the cylinder in the expansion stroke at S120 corresponding to the hybrid control portion 92.

As described above, according to this example, when a cylinder in the expansion stroke is in a state in which a high explosion torque is generated by the ignition start, the ignition start can be performed in the cylinder in the expansion stroke. In other words, if a cylinder in the expansion stroke is in a state in which a high explosion torque is generated even when the combustion is caused first in the cylinder, the combustion is caused first in the cylinder in the expansion stroke. On the other hand, if an oxygen concentration is reduced in a cylinder in the expansion stroke, the combustion is not caused first in the cylinder in the expansion stroke, and the combustion is caused first in a cylinder other than the cylinder in the expansion stroke to put the cylinder in the expansion stroke into a state in which a high explosion torque is generated before causing the combustion in the cylinder in the expansion stroke. Therefore, the engine startability can be improved at the engine start by the ignition start.

According to this example, if the exhaust valve 64 of the cylinder stopped in the expansion stroke is temporarily opened due to an overshoot in the rotation stop process of the engine 14, the reversal start is performed that causes the combustion first in a cylinder stopped in the compression stroke to negatively rotate the engine 14 before causing the combustion in the cylinder in the expansion stroke to positively rotate the engine 14. As a result, the cylinder in the expansion stroke is compressed by the negative rotation of the engine 14 due to the combustion caused first in the cylinder stopped in the compression stroke and, therefore, even when a cylinder in the expansion stroke has an oxygen concentration in the cylinder reduced because the exhaust valve 64 is temporarily opened, a high explosion torque can be acquired at the time of the first explosion of the cylinder. The reversal start causes the combustion in the cylinder containing a large amount of exhaust gas after the first explosion of the cylinder in the expansion stroke and, therefore, the explosion torque at the time of combustion in the cylinder is made smaller. Since the explosion torque is suppressed in this way and the increase in the engine rotation speed Ne is slowed, the occurrence of the overshoot of the engine rotation speed Ne exceeding the electric motor rotation speed Nm is suppressed and the clutch K0 is promptly completely engaged. On the other hand, if the exhaust valve 64 of the cylinder stopped in the expansion stroke is not temporarily opened, the combustion is caused first in the cylinder stopped in the expansion stroke to positively rotate the engine 14. As a result, the sufficient explosion torque can be acquired at the first explosion even if the combustion is caused first in the cylinder in the expansion stroke without temporary opening of the exhaust valve 64. Therefore, the engine startability can be improved at the engine start by the ignition start.

According to this example, since fuel is injected to the cylinder in the expansion stroke while the engine 14 is negatively rotating during the reversal start, the fuel is injected while an airflow occurs in the cylinder due to the negative rotation, facilitating the homogenization of air-fuel mixture in the cylinder in the expansion stroke. Therefore, because the first explosion itself easily occurs in the cylinder in the expansion stroke and a high explosion torque is more easily acquired at the first explosion, the engine startability can be improved.

According to this example, since during the reversal start, the cylinder in the expansion stroke is ignited before the cylinder reaches the top dead center and when during the reversal start, the negative rotation of the engine 14 is reduced in speed, the combustion is caused in an advanced state of air compression in the cylinder in the expansion stroke. The first explosion in the cylinder in the expansion stroke is generated while the reaction torque associated with the negative rotation of the engine is small. Therefore, because the first explosion itself easily occurs in the cylinder in the expansion stroke and a high explosion torque is more easily acquired at the first explosion, the reversal start is properly performed and the engine startability can be more improved.

According to this example, since, the clutch K0 is controlled toward engagement to increase the engine rotation speed Ne after the engine 14 positively rotates, the ignition start is performed first to suppress the MG torque Tm when the clutch K0 is controlled toward engagement. Therefore, during the EV running mode, the MG torque Tm secured for the engine start is suppressed and the EV running region is expanded. Since the occurrence of the overshoot of the engine rotation speed Ne is suppressed during the reversal start, the clutch K0 is promptly completely engaged. Thus, the engine startability can be improved at the engine start by the ignition start.

Although the example of the present invention has been described in detail with reference to the drawings, the present invention is applied in other forms.

For example, although the form of performing the reversal start is exemplified for a state in which the exhaust valve 64 of a cylinder stopped in the expansion stroke due to the overshoot in the rotation stop process of the engine 14 has a history of the temporary opening in the example, this form is not a limitation. For example, the reversal start may be performed even in a state in which the exhaust valve 64 of a cylinder stopped in the expansion stroke is currently open. In particular, the actuation of the exhaust valve 64 in the cylinder stopped in the expansion stroke in the rotation stop process of the engine 14 includes not only whether the valve is temporarily opened but also whether the valve is consequently put into an open state.

In the flowchart of FIG. 7 in the example, S30 may be followed by S50 (S70 is also available) and, if the determination of S50 is affirmative, S40 may be executed. In this case, if the determination of S40 is affirmative, S80 is executed and, if the determination of S40 is negative, S60 is executed. Apart from this, although it is determined at S90 of the flowchart of FIG. 7 whether the engine 14 starts rotating in the reverse direction, this form is not a limitation. For example, it may be determined at S90 whether the engine 14 is rotating in the reverse direction. As described above, the flowchart of FIG. 7 can be changed as needed within a permissible range in terms of the details of execution of the steps and the order of the execution.

Although the reversal start has been described by exemplifying a four-cylinder engine as depicted in FIGS. 5 and 6 in the example, the present invention can be applied engines other than the four-cylinder engine. For example, the engine may be a five-cylinder engine or a six-cylinder engine.

Although the clutch K0 is completely engaged after the engine rotation speed Ne is synchronized with the electric motor rotation speed Nm in the example, this is not a limitation. For example, since the increase in the engine rotation speed Ne is slowed during the reversal start, the clutch K0 may completely be engaged while the engine rotation speed Ne is changing toward synchronization with the electric motor rotation speed Nm. Although this is somewhat disadvantageous for the suppression of shock, the responsiveness of the engine start is improved.

Although the ignition start is performed and the engine 14 is started by the electric motor MG in the example, this is not a limitation. For example, the engine 14 may be started by a starter motor disposed separately from the electric motor MG while being assisted by the ignition start. Alternatively, for example, if the engine can be started by the ignition start only, the engine 14 does not need to be started by the electric motor MG (or a starter). In particular, the present invention may be applicable as long as the electronic control device 90 performs the ignition start when the engine rotation speed Ne is increased from zero and the ignition start is first performed when the engine 14 in the rotation stop state is started.

Although the torque converter 16 and the automatic transmission 18 are provided in the vehicle 10 in the example, the torque converter 16 and the automatic transmission 18 may not necessarily be provided.

The above description is merely an embodiment and the present invention may be implemented in variously modified and improved forms based on the knowledge of those skilled in the art.

NOMENCLATURE OF ELEMENTS

10: vehicle
14: engine
50: cylinder
64: exhaust valve

90: electronic control device (control device)
K0: engine connecting/disconnecting clutch (clutch)
MG: electric motor

The invention claimed is:

1. A control device of a vehicle including an engine, an electric motor, and a clutch disposed on a power transmission path between the engine and the electric motor, the control device of the vehicle comprising:
    circuitry programmed to:
        perform an ignition start causing combustion in a cylinder of the engine to rotate the engine at a start of the engine;
        switch a cylinder in which combustion is first caused in the engine based on an actuation, during a rotation stop process of the engine, of an exhaust valve in a cylinder stopped in an expansion stroke, when performing the ignition start at the start of the engine;
        determine whether or not the exhaust valve of the cylinder stopped in the expansion stroke is temporarily opened because rotational position of the engine advances beyond a rotation stop state during the rotation stop process of the engine;
        when it is determined that the exhaust valve of the cylinder stopped in the expansion stroke is temporarily opened, perform a reversal start causing combustion first in a cylinder stopped in a compression stroke to negatively rotate the engine before causing combustion in the cylinder in the expansion stroke to positively rotate the engine; and
        when it is determined that the exhaust valve of the cylinder stopped in the expansion stroke is not temporarily opened, cause combustion first in the cylinder stopped in the expansion stroke to positively rotate the engine.

2. The control device of the vehicle of claim 1, wherein fuel is injected to the cylinder in the expansion stroke while the engine is negatively rotating during the reversal start.

3. The control device of the vehicle of claim 1, wherein during the reversal start, the cylinder in the expansion stroke is ignited before the cylinder in the expansion stroke reaches a top dead center and when engine rotation speed in a negative direction is reduced in speed.

4. The control device of the vehicle of claim 1, wherein the clutch is controlled toward engagement to increase engine rotation speed after the engine positively rotates.

5. The control device of the vehicle of claim 1, wherein the circuitry is configured to perform the ignition start in response to an engine restart request requesting restart of rotation of the engine that is stopped.

* * * * *